US006576327B1

(12) United States Patent
Weissmann et al.

(10) Patent No.: US 6,576,327 B1
(45) Date of Patent: Jun. 10, 2003

(54) MULTI-LAYER, FLEXIBLE TRANSFER TAPE

(75) Inventors: Karl-Heinz Weissmann, Hannover (DE); Martina Buchholz, Garbsen (DE); Wolfgang Giersemehl, Lehrte (DE); Wolfgang Bauersachs, Wedemark (DE)

(73) Assignee: Pritt Produktionsgesellschaft mbH

( * ) Notice: Subject to any disclaimer, the term of this patent is extended or adjusted under 35 U.S.C. 154(b) by 0 days.

(21) Appl. No.: 09/529,281

(22) PCT Filed: Sep. 29, 1998

(86) PCT No.: PCT/EP98/06172

§ 371 (c)(1),
(2), (4) Date: Jun. 16, 2000

(87) PCT Pub. No.: WO99/19149

PCT Pub. Date: Apr. 22, 1999

(30) Foreign Application Priority Data

Oct. 10, 1997 (DE) ........................................ 197 44 957

(51) Int. Cl.$^7$ ............................ B32B 7/06; B32B 0/00; B32B 7/12

(52) U.S. Cl. ........................ 428/202; 428/220; 428/352

(58) Field of Search ................................ 428/202, 220, 428/352

(56) References Cited

U.S. PATENT DOCUMENTS

| | | | | |
|---|---|---|---|---|
| 4,891,260 A | 1/1990 | Kunkel et al. | .............. | 428/220 |
| 5,135,798 A | 8/1992 | Muschter et al. | ........... | 428/202 |
| 5,175,058 A | 12/1992 | Traver | ........................ | 428/447 |
| 5,242,725 A | 9/1993 | Weissmann et al. | .......... | 428/40 |

FOREIGN PATENT DOCUMENTS

| | | |
|---|---|---|
| CA | 2253630 | 11/1997 |
| DE | 196 17 850 | 6/1997 |
| EP | 0 318 804 | 6/1989 |
| EP | 0 479 221 | 4/1992 |
| WO | WO 96/28308 | 9/1996 |

OTHER PUBLICATIONS

Dr. H Stache, Tensid–Taschenbch_, Carl–Hanser Verlag Munchen, Wien, pp. 2/3 (1979).

Rompps Chemie–Lexikon, 7, Aufl., Georg Thieme Verlag, Bd. 6, p. 4495, r. Sp. Bis p. 4499, 1 Sp. (1992).

*Primary Examiner*—B. Hamilton Hess
*Assistant Examiner*—L D Ferguson
(74) *Attorney, Agent, or Firm*—Stephen D. Harper; Daniel S. Ortiz

(57) ABSTRACT

Multi-layer flexible transfer tapes are provided which are useful for covering printing or typing errors in texts or drawings so that corrections may be made. The transfer tapes are characterized by the inclusion of two binder-containing pigmented transfer layers, wherein one transfer layer is cationic and the other transfer layer is anionic.

12 Claims, No Drawings

MULTI-LAYER, FLEXIBLE TRANSFER TAPE

FIELD OF THE INVENTION

This invention relates to a multilayer flexible transfer tape comprising a backing and a layer of pressure-sensitive adhesive, at least one binder-containing pigmented transfer layer being present between the backing and the layer of pressure-sensitive adhesive and showing greater adhesion to the layer of pressure-sensitive adhesive than to the backing.

BACKGROUND OF THE INVENTION

A transfer tape of the type described above is known, for example, from DE 196 17 850 C1. This document describes a transfer tape in which a pigmented, particularly white-pigmented, transfer layer, then another pigmented transfer layer containing a non-white pigment and finally the layer of contact adhesive are arranged on a conventional backing. This tape is particularly effective in covering the transfer layer without any significant loss of "whiteness". The known tape is advantageously used in roll form in hand-held "rollers" so that the transfer layer can be applied simply, quickly and uniformly to a substrate in order to cover printing/typing errors in texts or drawings so that corrections may be made. The transfer layer applied can then be written on, for example with a fountain pen or ball-point pen. In some cases, it has been found in connection with such corrections that the dyes in the lettering covered by the tape migrate to the surface of the covering layer applied, particularly under the influence of moisture, so that the covered letting can be seen again.

SUMMARY OF THE INVENTION

Accordingly, the problem addressed by the present invention was to further develop the transfer tape mentioned at the beginning in such a way that the "strike-through" of covered lettering would be eliminated without any adverse effect on the desirable properties, particularly the covering power of the transfer layer.

According to the invention, the solution to this problem is characterized in that the transfer tape comprises two binder-containing pigmented transfer layers, one of the pigmented transfer layers being cationic and the other pigmented transfer layer being anionic.

DETAILED DESCRIPTION OF THE INVENTION

Advantageous embodiments of the present invention are defined in the subsidiary claims. In these embodiments, the two transfer layers have a thickness of about 5 to 25 g/m$^2$ and a total thickness of about 15 to 30 g/m$^2$. The separate adhesive layer preferably has a thickness of about 1 to 5 g/m$^2$ and more preferably in the range from about 2 to 4 g/m$^2$. Particularly good effects are obtained if a fine-particle metal powder, more particularly fine-particle aluminium, is present in the anionic transfer layer and/or in the adhesive layer. The fine-particle metal powder is preferably present in the form of platelets. The platelet-like aluminium particles advantageously have a thickness of about 3 to 10 $\mu$m and a diameter of about 4 to 17 $\mu$m. The quantity of fine-particle metal powder used is between about 0.1 and 3.5% by weight, based on the particular dry layer. Particularly favorable effects are obtained if the anionic transfer layer is located between the cationic transfer layer and the adhesive layer. If the fine-particle metal powder is present in the adhesive layer, the sequence of the anionic and cationic transfer layers is of no relevance. In individual cases, it is of particular advantage if, as seen from the backing, the cationic transfer layer is applied first, followed by an adhesive, anionic transfer layer with no further layer of pressure-sensitive adhesive, the adhesive anionic transfer layer in particular containing fine-particle metal, more particularly fine-particle aluminium.

The basic concept of the present invention is that, irrespective of the sequence in the layer structure of the transfer tape, the transfer tape comprises a cationic and additionally an anionic transfer layer. The terms "anionic" and "cationic" will readily be understood by the expert. The transfer layers are preferably prepared using binder dispersions, i.e. dispersions containing solid small polymer particles, more particularly in aqueous form. Commercially obtainable cationic and anionic aqueous dispersions may be used, for example cationic aqueous dispersions commercially obtainable as Acronal®) 280 KD (from BASF AG), Butonal® LS 170 K (from BASF AG), Jagotex® AL 2463 (from Jäger), cationic solutions obtainable, for example, as Worleecryl® (cationic pure acrylate solution, clear to slightly milky solution, on the one hand 25% in water (7712 W) and on the other hand 40% in water/isopropanol (40:20) (7712), pH value 5 in either case) (from Worlee Chemie GmbH, Hamburg) and anionic aqueous dispersions obtainable as Acronal® S 725 and S 726 (butyl acrylate/styrene copolymer) (from BASF AG), as Acronal® V 205 (from BASF AG), as Styrofan® D 422 and Propiofan® 6D (from BASF AG). The activities mentioned are attributable to the particular surfactant used in the emulsion polymerization process. In the case of an anionic dispersion, anionic surfactants a carboxyl group ($-COO^-$) are used as stabilizers in the emulsion polymerization. These groups face outwards from the dispersed polymer particles. In the case of the cationic dispersions, cationic surfactants which almost without exception contain a quaternary ammonium ion ($-N^+(R_3)$) as hydrophilic group are used in the emulsion polymerization process. This information is all the expert needs to choose suitable commercially available ionic aqueous dispersions for achieving the objects of the invention. Reference is made in this connection to Dr. H. Stache "Tensid-Taschenbuch", Carl Hanser Verlag München/Wien, 1979, pp. 2/3 and Römpps Chemie-Lexikon, 7$^{th}$ Edition, Georg Thieme Verlag, 1992, Vol. 6, p. 4495, right-hand column to 4499, left-hand column.

Accordingly, the above-mentioned aqueous dispersions and solutions are preferably used in the production of the transfer layers to be formed in accordance with the invention. The above list of aqueous dispersions/solutions is by no means complete and, in particular, is not limiting in regard to their choice. On the contrary, it is quite clear to the expert that other binders may also be used, especially since the essence of the invention does not lie in the type of binder used, but solely in the cationic or anionic character of the transfer layer. The concentration of the binder in the dispersion is not critical. As a rough guide, it may be between about 25 and 70% by weight and is preferably between about 40 and 60% by weight. The aqueous dispersion for forming the transfer layers is applied to the backing in a quantity of preferably about 15 to 35 g/m$^2$ (dry weight) and more preferably about 18 to 25 g/m$^2$, this quantity representing the total quantity of both transfer layers, i.e. the cationic and anonic transfer layer.

Typical additives, for example foam inhibitors, wetting agents and the like, may be used in the production of the various layers.

The layer of pressure-sensitive adhesive may consist of commercially available pressure-sensitive adhesives, for example the Freihoff-Dispersion VP 859/6. The above-described materials of the individual layers of the transfer tape according to the invention generally satisfy the basic requirement that the adhesive tension between the backing and the transfer layers mentioned is lower than between the transfer layers and the layer of pressure-sensitive adhesive (cf. DE 196 17 850 C1).

Technologically, the invention may be explained as follows: most of the dyes in writing fluids are synthetic dyes based on aromatic or heterocyclic compounds. The dyes are either ionic (for example all water-soluble dyes) and non-ionic compounds (for example dispersions dyes). Among the ionic dyes, there are anionic and cationic types. The anionic dyes have a negatively charged dye ion while the cationic dyes have a positively charged dye ion so that, previously, a distinction was generally drawn between acidic and basic dyes. It has been found that, irrespective of the particular type of lettering, i.e. whether it contains an anionic or cationic dye, the present invention—in the covering of a writing/printing error for example—enables the troublesome migration of the dyes through the covering layer to be eliminated. If the lettering contains an anionic dye, the cationic transfer layer of the transfer tape according to the invention blocks any migration. In the case of a cationic dye, this blocking effect is developed by the anionic covering layer (cationic dye binds to the anionic layer, etc.). Here, the dye does not migrate through the polymer itself, but through microvoids present in the transfer layer. If the dye migrates through those voids, it automatically comes into contact with the active and outwardly directed parts of the surfactants present on the surface of the polymer particles and is arrested by corresponding interaction.

The advantages obtainable through the invention may be summarized as follows: the above-mentioned strike-through of covered lettering is eliminated in the required manner without any adverse effect on the desirable properties or on the covering power of the transfer layer. Writing/printing can be permanently covered.

The invention is illustrated by the following Examples.

EXAMPLE 1

The following aqueous dispersions were prepared to form the various layers of the transfer tape according to the invention.

Dispersion for the Cationic Transfer Layer

| | |
|---|---|
| Aqueous acrylate solution (25% in water/Worleecryl ® 7712 W (Worlée Chemie GmbH, Hamburg) | 35.0 parts by weight |
| Water | 15.3 parts by weight |
| Alkylammonium salt of polycarboxylic acids (Lactimon ® WS, Byk Chemie GmbH) | 1.0 part by weight |
| Defoamer (hydrophilic silicone-like components in mineral oil) (Byk ® 034) | 0.2 part by weight |
| Amorphous silica (Syloid ® 244, Grace, USA) | 5.0 parts by weight |
| Titanium dioxide (rutile) (Finntitan RDD, Kemira, Finland) | 43.5 parts by weight |
| | 100.0 parts by weight |

Dispersion for the Anionic Transfer Layer

| | |
|---|---|
| Aqueous copolymer dispersion of n-butyl acrylate and styrene (45%) (Acronal ® S 725, BASF AG) | 36.0 parts by weight |
| Aqueous carboxyfunctional acrylate copolymer (69%) (Acronal ® V 205, BASF AG) | 4.0 parts by weight |
| Aqueous polyvinyl propionate (50%) (Propiofan ® 6 D, BASF AG) | 1.0 part by weight |
| Water | 4.5 parts by weight |
| Sodium salt of a polyacrylic acid (40% in water) (Indunal ® NKS, Indulor Chemie) | 0.5 part by weight |
| Na salt of a sulfosuccinic acid ester (Lumiten ® IRA, BASF AG) | 1.0 part by weight |
| Mixture of fatty acid, polyglycol derivatives and hydrocarbons (Dehydran ® 1227) | 1.0 part by weight |
| Titanium dioxide (rutile) (Finntitan RDD, Kemira, Finland) | 50.0 parts by weight |
| Sodium aluminium silicate (Ketjensil SM 405, Akzo-Chemie) | 2.0 parts by weight |
| | 100.0 parts by weight |

For Forming the Layer of Pressure-sensitive Adhesive

| | |
|---|---|
| Aqueous acrylate dispersion (50%) (Freihoff-Dispersion VP 859/6, Freihoff-Chemie) | 65.0 parts by weight |
| 25% aqueous ammonia solution | 1.5 parts by weight |
| Na salt of a sulfosuccinic acid ester (Lumiten ® IRA of BASF AG) | 1.0 part by weight |
| Water | 32.5 parts by weight |
| | 100.0 parts by weight |

The above dispersion for forming the cationic layer is knife-coated in a quantity of 10 g/$m^2$ onto a 50 $\mu$m thick siliconized paper support. The water is then evaporated off at around 100° C. by passing warm air over. The aqueous dispersion for forming the anionic layer is then knife-coated in the same way onto the surface of the already formed cationic layer and the water is subsequently evaporated therefrom. The layer of pressure-sensitive adhesive is then formed on this layer combination by applying the aqueous dispersion described above in a quantity of 5 g/$m^2$. The water is evaporated off as described above.

EXAMPLE 2

The procedure is as described in Example 1 except that the following formulation is used to form the anionic layer.

| | |
|---|---|
| Aqueous copolymer dispersion of n-butyl acrylate and styrene (45%) (Acronal ® S 725, BASF AG) | 30.0 parts by weight |
| Aqueous carboxyfunctional acrylate copolymer (69%) (Acronal ® V 205, BASF AG) | 10.0 parts by weight |
| Aqueous polyvinyl propionate (50%) (Propiofan ® 6 D, BASF AG) | 1.0 part by weight |
| Water | 4.0 parts by weight |
| Sodium salt of a polyacrylic acid (40% in water) (Indunal ® NKS, Indulor Chemie) | 0.5 part by weight |
| Na salt of a sulfosuccinic acid ester (Lumiten ® IRA, BASF AG) | 1.0 part by weight |
| Mixture of fatty acid, polyglycol derivatives and hydrocarbons (Dehydran ® 1227) | 1.0 part by weight |
| Titanium dioxide (rutile) (Finntitan RDD, Kemira, Finland) | 50.0 parts by weight |
| Sodium aluminium silicate (Ketjensil SM 405, Akzo-Chemie) | 2.0 parts by weight |
| Aqueous aluminium paste (65% (Aquasilber LPW 1380, Schlenk AG) | 0.5 part by weight |
| | 100.0 parts by weight |

A This dispersion is used instead of the dispersion of Example 1 with which the anionic transfer layer was formed. The formulation is designed to be tacky so that there is no need here to form a layer of pressure-sensitive adhesive, as in Example 1. The dispersion is applied in a quantity of 10 $g/m^2$.

EXAMPLE 3

Example 1 is repeated with the modification that the dispersion described there for forming the layer of pressure-sensitive adhesive is replaced by the following formulation.

| | |
|---|---|
| Aqueous acrylate dispersion (50%) (Freihoff-Dispersion VP 859/6, Freihoff-Chemie) | 65.0 parts by weight |
| Aluminium paste (65%) (Aquasilber LPW 1380, Schlenk AG) | 2.0 parts by weight |
| 25% aqueous ammonia solution | 1.5 parts by weight |
| Na salt of a sulfosuccinic acid ester (Lumiten ® IRA of BASF AG) | 1.0 part by weight |
| Water | 30.5 parts by weight |
| | 100.0 parts by weight |

This formulation is knife-coated onto the anionic transfer layer formed beforehand in a quantity of 5 $g/m^2$ by the same procedure as described in Example 1.

What is claimed is:

1. A multi-layer flexible transfer tape comprising a backing, a layer of pressure-sensitive adhesive, and two binder-containing pigmented transfer layers, which are different from the layer of pressure sensitive adhesive, wherein at least one binder-containing pigmented transfer layers are present between the backing and the layer of pressure-sensitive adhesive, one of the binder-containing pigmented transfer layers is cationic, and one of the binder-containing pigmented transfer layers is anionic.

2. The multi-layer flexible transfer tape of claim 1 wherein each of the binder-containing pigmented transfer layers has a thickness of about 5 to about 25 $g/m^2$ and the total thickness of the binder-containing pigmented transfer layers is about 15 to about 30 $g/m^2$.

3. The multi-layer flexible transfer tape of claim 1 wherein the adhesive layer has a thickness of about 1 to about 5 $g/m^2$.

4. The multi-layer flexible transfer tape of claim 1 wherein a fine particle metal powder is present in one or both of the anionic binder-containing pigmented transfer layer and the adhesive layer.

5. The multi-layer flexible transfer tape of claim 4 wherein the fine particle metal powder is comprised of aluminum.

6. The multi-layer flexible transfer tape of claim 4 wherein the fine particle metal powder is present in the form of platelets.

7. The multi-layer flexible transfer tape of claim 6 wherein the platelets have a thickness of about 3 to about 10 $\mu$m and a diameter of about 4 to about 1 7 $\mu$m.

8. The multi-layer flexible transfer tape of claim 4 wherein the fine particle metal powder comprises about 0.1 to about 3.5% by weight of the anionic binder-containing pigmented transfer layer or adhesive layer in which the fine particle metal powder is present.

9. The multi-layer flexible transfer tape of claim 1 wherein the anionic binder-containing pigmented transfer layer is located between the cationic binder-containing pigmented transfer layer and the adhesive layer.

10. A multi-layer flexible transfer tape comprising (a) a backing;

(b) an anionic binder-containing pigmented transfer layer having a thickness of about 5 $g/m^2$ to about 25 $g/m^2$;

(c) a cationic binder-containing pigmented transfer layer having a thickness of about 5 $g/m^2$ to about 25 $g/m^2$; and (d) a pressure-sensitive adhesive layer having a thickness of about 1 $g/m^2$ to about 5 $g/m^2$;

wherein the cationic binder-containing pigmented transfer layer is located between the backing and the anionic binder-containing pigmented transfer layer and the anionic binder-containing pigmented transfer layer is located between the cationic binder-containing pigmented transfer layer and the pressure-sensitive adhesive layer.

11. The multi-layer flexible transfer tape of claim 10 wherein about 0.1 to about 3.5% by weight of fine particle metal powder comprised of aluminum is present in one or both of the anionic binder-containing pigmented transfer layer and the pressure-sensitive adhesive layer.

12. The multi-layer flexible transfer tape of claim 11 wherein the fine particle metal powder is in the form of platelets having a thickness of about 3 to about 10 $\mu$m and a diameter of about 4 to about 17 $\mu$m.

* * * * *

UNITED STATES PATENT AND TRADEMARK OFFICE

CERTIFICATE OF CORRECTION

PATENT NO. : 6,576,327 B1 Page 1 of 1
DATED : June 10, 2003
INVENTOR(S) : Weissmann et al.

It is certified that error appears in the above-identified patent and that said Letters Patent is hereby corrected as shown below:

Column 5,
Line 28, delete "at least one" and insert therefore -- the --.

Signed and Sealed this

Twenty-sixth Day of October, 2004

JON W. DUDAS
*Director of the United States Patent and Trademark Office*